Dec. 12, 1967     H. SABET     3,357,412
SEALING ARRANGEMENT
Filed May 20, 1966     3 Sheets-Sheet 2
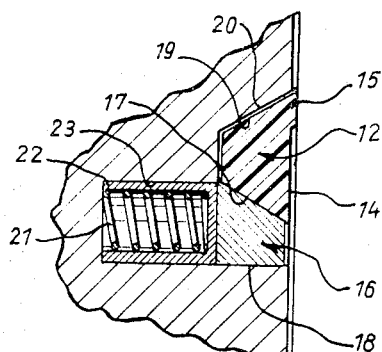
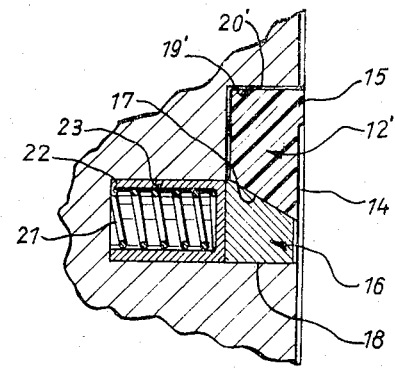
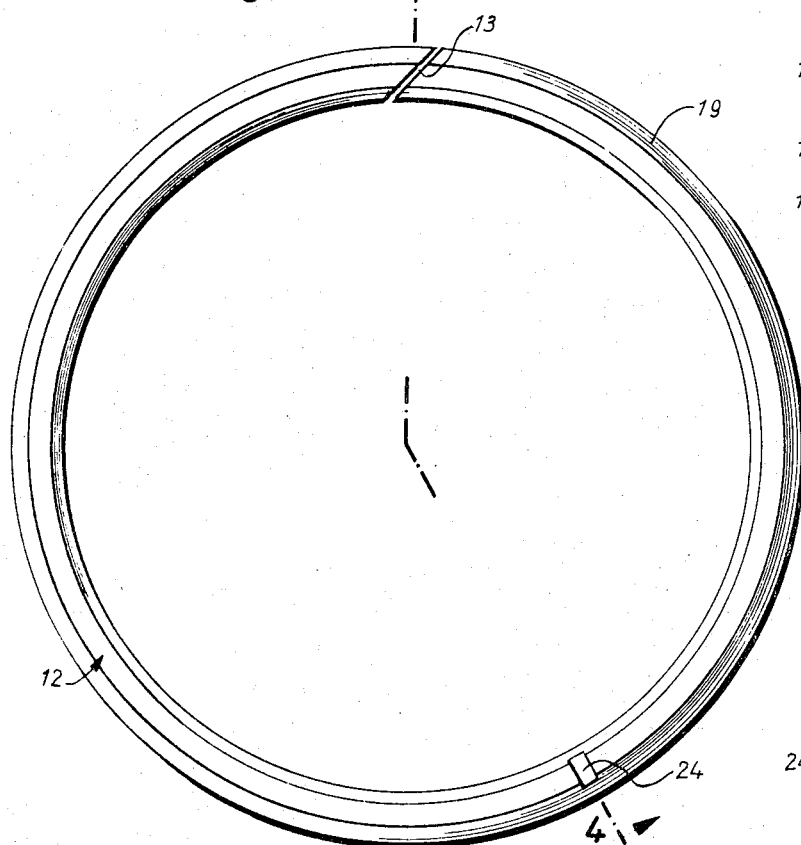
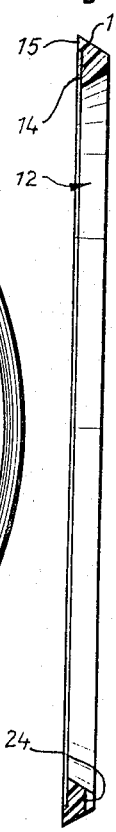
INVENTOR
Huschang Sabet
BY Spencer & Kaye
ATTORNEYS Dec. 12, 1967  H. SABET  3,357,412
SEALING ARRANGEMENT
Filed May 20, 1966  3 Sheets-Sheet 3

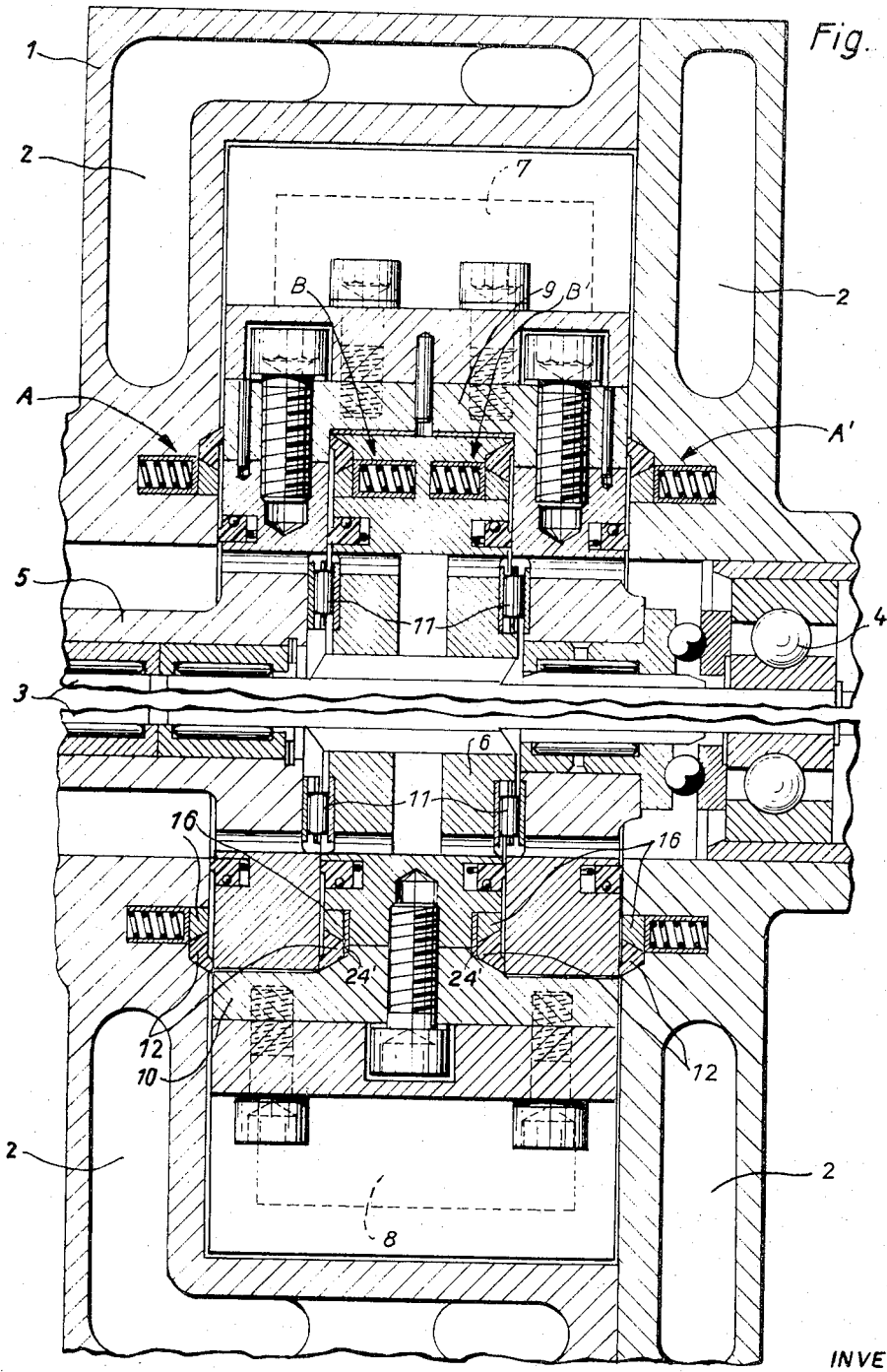

INVENTOR
Huschang Sabet

BY *Spencer E Kaye*

ATTORNEYS

United States Patent Office 3,357,412
Patented Dec. 12, 1967

3,357,412
SEALING ARRANGEMENT
Huschang Sabet, Eduard-Pfeiffer-Strasse 67,
Stuttgart-Nord, Germany
Filed May 20, 1966, Ser. No. 551,590
Claims priority, application Germany, May 26, 1965,
S 97,300
11 Claims. (Cl. 123—8)

The present invention relates to the field of sealing arrangements, and particularly to the sealing of piston engine cylinders.

The present invention is particularly concerned with seals, or gaskets, for the cylinders of rotary piston internal combustion engines, these seals being of the type having a sealing ring positioned in a groove of one engine portion and resting with its sealing surface on another engine portion which is movable with respect to the one engine portion.

In the field of rotary piston internal combustion engines, problems have been encountered in attempting to seal the interior of the annular cylinder in the radial direction, i.e., in a direction toward the engine shaft. Specifically, these problems arise during attempts to seal, on the one hand, the gaps between the engine housing and one rotary piston and, on the other hand, the gaps between the two coaxially arranged rotary pistons, one of which pistons rotates, in a known manner, at a uniform angular velocity and the other of which pistons rotates at a non-uniform angular velocity. None of the presently known sealing devices is capable of operating reliably under the existing high cylinder pressures while being subjected only to slight wear, or while providing an effective, safe seal even after experiencing a substantial amount of wear, and which, in addition, has a relatively long service life, without being unacceptably expensive.

It is a primary object of the present invention to overcome these drawbacks and difficulties.

A more specific object of the present invention is to provide an improved sealing between adjacent engine parts.

A still further object of the present invention is to produce a relatively inexpensive and durable seal.

These and other objects are achieved, according to the present invention, by the provision, in combination with a piston engine having a first engine part provided with a groove and a second engine part disposed with one surface adjacent said groove and arranged to rotate with respect to the first engine part, of sealing means comprising a split sealing ring and a pressure ring. The split sealing ring is disposed in the groove of the first engine part and has a substantially trapezoidal cross section defined by a wide base facing the one surface of the second engine part, a narrow base facing the bottom of the groove and a sloping, radially inwardly facing flank. The pressure ring according to the present invention is also disposed in this groove and arranged radially inwardly of the sealing ring, the pressure ring having a sloping, radially outwardly facing flank which extends substantially parallel to, and presses against, the inwardly facing flank of the sealing ring. As a result, pressure applied by the pressure ring acts to urge the sealing ring radially outwardly and expands the sealing ring in a direction toward the second engine part in order to maintain a good seal between the engine parts even when the sealing ring has experienced a substantial amount of wear during a relatively long period of use.

In further accordance with the present invention, the first engine part is also provided with a plurality of recesses in the groove bottom, which recesses are distributed around the circumference of the groove, and the arrangement further comprises a plurality of pressure springs disposed in these recesses and pressing against the pressure ring for urging the latter against the sealing ring.

According to a further feature of the present invention there are also provided a plurality of protective sleeves for protecting the springs from damage due to heat produced in the engine, each of these sleeves being disposed around a respective one of the springs and having a closed bottom interposed between its respective spring and the pressure ring.

Additional objects and advantages of the present invention will become apparent upon consideration of the following description when taken in conjunction with the accompanying drawings in which:

FIGURE 1 is a broken, cross-sectional view taken along a plane through the engine shaft of a rotary piston engine provided with one embodiment of the present invention.

FIGURE 2 is a detail, cross-sectional view of a portion of the arrangement of FIGURE 1.

FIGURE 2a is a view similar to that of FIGURE 2 showing a modified version of the arrangement of FIGURE 2.

FIGURE 3 is a plan view of a sealing ring according to the present invention.

FIGURE 4 is a cross-sectional view taken along the line 4—4 of FIGURE 3.

Figure 5:
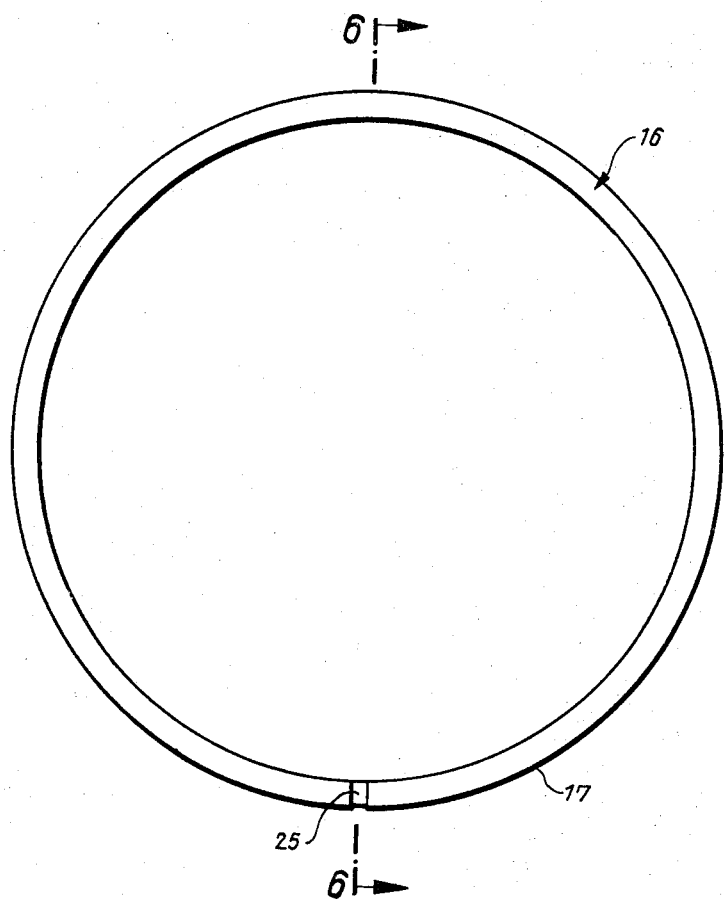
FIGURE 5 is a plan view of a pressure ring according to the present invention.

Referring first to FIGURE 1, there is shown a portion of a rotary piston engine which includes an engine housing 1 provided with channels 2 for the passage of a cooling medium. The engine also includes an engine shaft 3, one bearing of which is shown at 4. There are also provided two rotors carried by the engine shaft for rotation with respect to the housing 1, each of these rotors being provided with a respective one of the pistons 7 and 8, also known as piston vanes, each carried by a respective one of the hubs 5 and 6. The pistons are controlled by a suitable transmission (not shown) such that one piston rotates at a uniform speed and the other piston at a non-uniform speed in such a manner that, during each shaft rotation, the volume of the cylinder spaces situated between the two pistons varies in such a manner as to periodically increase and decrease and thus to produce a cyclic expansion and compression within the cylinder chambers.

The hub 5 is provided with a projecting portion 9 which extends radially outwardly around a portion of the motor circumference and carries piston vane 7, portion 9 serving as a bridge joining the two end portions of hub 5. Similarly, hub 6 is provided with a projection 10 which extends radially outwardly and which is disposed around another portion of the circumference of the motor, projection 10 being substantially coaxial with projection 9 and carrying piston vane 8. Between hubs 5 and 6 there are provided a plurality of roller bearings 11 which permit the two hubs to rotate freely with respect to one another.

For sealing the gaps between the housing 1 and the projection 9 of piston 7, two seals A and A' are provided, while the sealing of the gaps between projection 9 of hub 5 and projection 10 of hub 6 is effectuated by means of seals B and B'.

The seals A, A', B, and B' are each constituted, as is shown in greater detail in FIGURES 2 to 6, by a sealing ring 12 which is split at 13 (FIGURE 3). Ring 12 is of a suitable wear-resistant material and is made, for example, by molding so as to have a trapezoidal cross section. Each seal further includes a pressure ring 16 which is disposed radially inwardly of its respective sealing ring 12 and which also has a trapezoidal cross section. Pressure ring 16 has a sloping outer circumferential flank which bears against the inner circumferential flank of its associated sealing ring 12. Each seal further includes a plurality of springs which apply an axial force to the pressure ring 16 in a direction toward the sealing gap so as to cause the pressure ring to apply pressure to the sealing ring. The rings 12 and 16 are made from high-strength cast iron.

Two embodiments of such sealing arrangements are shown in detail in FIGURES 2 and 2a. As is shown in FIGURE 2, the sealing ring 12 having a trapezoidal cross section is preferably constructed so that its flanks, which constitute the inner and outer circumference of the ring, lie at an angle of 60° with respect to one another. Sealing ring 12 is disposed in a suitable groove either in housing 1 or in hub portion 10 with its narrow base disposed adjacent the groove bottom. The wide base 14 of ring 12 is provided with an axially projecting annular portion 15 disposed adjacent the outer circumference of ring 12 and extending into the gap to be sealed. This annular portion 15 constitutes a sealing strip which is arranged to bear against the surface of the adjacent engine part with which a seal is to be formed. In the embodiment of FIGURE 2, the sealing ring 12 is provided with a sloping outer flank 19 which bears against a similarly sloping side wall 20 of the groove. In the embodiment of FIGURE 2a, the sealing ring 12' is provided with an outer flank 19' which is perpendicular to the wide and narrow bases of the sealing ring, this outer flank lying against the outer groove side wall 20' which lies perpendicular to the bottom of the groove.

The pressure ring 16 is provided with a sloping outer flank 17 and an inner flank 18 which is perpendicular to the wide and narrow bases of the pressure ring. The sloping outer flank 17 bears against a similarly sloping inner flank of sealing ring 12 (12' in FIGURE 2a). The groove in which the rings 12 and 16 are disposed is provided with a plurality of circumferentially spaced recesses 23 in each of which is disposed a compression spring 21 enclosed by a protective sleeve 22 having a closed bottom. The recesses 23 are so arranged that the springs 21 are disposed opposite the large base of ring 16, with the closed bottom of each sleeve 22 being interposed between its respective spring 21 and the wide base of pressure ring 16. Springs 21 are originally placed under compression in order to apply a continuous axial pressure to pressure ring 16. Sleeves 22 are provided primarily for the purpose of thermally insulating springs 21 so as to prevent their being damaged by the heat produced in the engine. The sleeve 22 can be made from bronze for example.

This force applied to pressure ring 16 causes ring 16 to force sealing ring 12 radially outwardly. This, in turn, has the effect of producing a slight elastic enlargement of the circumference of spring 12 and of forcing the outer flank 19 of the sealing ring 12 against the corresponding groove side wall 20. In order to create a uniform pressure around the circumference of sealing ring 12, it has been found desirable to employ a plurality of springs 21, six to eight such springs for example, and to distribute these springs uniformly around the circumference of the seal.

The pressure applied by springs 21 also acts to radially compress sealing ring 12 so as to axially expand the ring and thus to press sealing strip 15 against the adjacent engine part, the pressure applied to ring 12 acting to cause strip 15 to exert a relatively high sealing pressure on the surface against which it bears.

Because of the constant pressure applied by springs 21, and because the outer flank 19 of sealing ring 12 is pressed in a positive manner against the groove wall 20 while the sealing strip 15 is similarly pressed against the surface upon which it bears, a highly reliable seal is produced between the two adjacent engine parts. Moreover, this seal will remain effective during a long period of use even if a substantial amount of wear should be produced due to the relative movement of the two parts between which the seal is effected.

In certain cases, it may be desirable to prevent the sealing ring from coming in contact with other sealing strips disposed at the circumference of the rotary pistons. A number of these other strips generally extend in a radial direction and bear against the front surface of the housing, while the remaining ones of these other strips extend parallel to the axis of rotation of the motor and bear, for example in the case of the uniformly rotating rotary piston, against the projecting portions of the non-uniformly rotating piston. In order to prevent such a contact from occurring, the seal according to the present invention may be constructed in the manner illustrated in FIGURE 2a, with the outer flank 19' of the sealing ring 12' defining a right circular cylinder and the outer side wall 20' of the groove having a similar configuration. This arrangement assures that the pressure applied to sealing ring 12' will only urge sealing strip 15 in a direction parallel to the axis of motor rotation so that the strip will not come in contact with, and hence will not disturb the sealing effect of, the further strips positioned radially beyond sealing ring 12'.

FIGURE 3 shows a plan view of one form which the sealing ring 12 may be given. As may be seen, this ring is split at 13 and is provided with a sloping outer flank 19.

FIGURE 4 shows a side view of this sealing ring and illustrates particularly the manner in which a portion of the wide base 14 is removed to produce the relatively narrow sealing strip 15 which extends around the outer circumference of the ring adjacent the outer flank 19 thereof.

FIGURE 5 is a plan view of one form for the pressure ring 16 according to the present invention, this ring being provided with a sloping outer flank 17 which is designed to bear against the inner flank of sealing ring 12.

Figure 6:
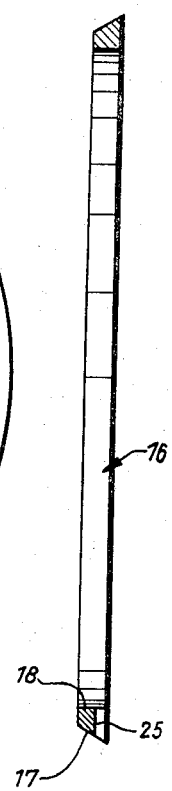
FIGURE 6 is a cross-sectional view taken along the line 6—6 of FIGURE 5.

As shown in the side view of FIGURE 6, the pressure ring 16 is also formed with a cylindrical inner flank 18 which is designed to bear against the inner side wall of the groove in which the two rings are disposed.

In many situations, it may be desirable to prevent the sealing ring 12 and the pressure ring 16 from rotating in the groove in which they are disposed. This may be achieved by providing the sealing ring with a suitable notch 24 (FIGURES 3 and 4) and the pressure ring with a corresponding notch 25 (FIGURES 5 and 6) which are dimensioned to engage a radial projection formed in the bottom of the groove in which they are disposed, the notches 24 and 25 then being in alignment with one another. One such projection is shown in the lower half of FIGURE 1 as a projection 24' extending from the bottom of the groove of seals B and B'.

A similar result could be obtained by providing the pressure ring 16 with a suitable projection which is arranged to engage in a suitable recess in the groove, and by providing a similar arrangement for preventing the sealing ring 12 from rotating, or by providing a pin or key which extends into notches 24 and 25.

The installation of seals A, A' in the engine housing itself is preferably carried out in such a manner that the gap 13 in sealing ring 12 is as far as possible from the engine housing region containing the spark plugs and fuel inlet. In other words, gaps 13 are preferably disposed in the low pressure regions in the engine housing. The installation of the seals B, B' between hubs 5 and 6 is preferably carried out in such a manner that the gaps 13 are disposed between the other sealing strips situated at the circumference of one of the pistons.

In order to reduce the wear to which the sealing rings according to the present invention will be subjected, the compression of springs 21 is preferably adjusted so that those springs disposed in the engine housing in the region of the spark plugs will apply a greater sealing force than those springs arranged in the region of the outlet and suction passages of the engine.

It will be understood that the above description of the present invention is susceptible to various modifications, changes, and adaptations, and the same are intended to be comprehended within the means and range of equivalents of the appended claims.

What is claimed is:

1. In combination with a piston engine having a first engine part provided with a groove, and a second engine part disposed with one surface adjacent said groove and arranged to rotate with respect to said first engine part, sealing means comprising:
   (a) a split sealing ring disposed in said groove and having a substantially trapezoidal cross section defined by a wide base facing said one surface of said second part, a narrow base facing the bottom of said groove, and a sloping, radially inwardly facing flank; and
   (b) a pressure ring disposed in said groove radially inwardly of said sealing ring and having a sloping, radially outwardly facing flank which extends substantially parallel to, and presses against, said inwardly facing flank of said sealing ring.

2. An arrangement as defined in claim 1 wherein said first part is further provided with a plurality of recesses distributed around the circumference, and extending from the bottom, of said groove, and said arrangement further comprises a plurality of pressure springs disposed in said recesses and pressing against said pressure ring for urging the latter against said sealing ring.

3. An arrangement as defined in claim 2 further comprising a plurality of protective sleeves for protecting said springs from damage due to heat produced in said engine, each said sleeve being disposed around a respective one of said springs and having a closed bottom interposed between its respective spring and said pressure ring.

4. An arrangement as defined in claim 1 wherein said wide base of said sealing ring is provided with an annular projecting portion disposed adjacent the outer flank of said ring and extending toward said one surface of said second engine part to form a narrow sealing strip.

5. An arrangement as defined in claim 1 further comprising means for preventing said sealing ring from rotating in said groove.

6. An arrangement as defined in claim 5 further comprising means for preventing said pressure ring from rotating in said groove.

7. An arrangement as defined in claim 5 wherein said means for preventing said sealing ring from rotating are constituted by a notch formed in said sealing ring and a corresponding projection provided in said groove.

8. An arrangement as defined in claim 1 wherein said first engine part is constituted by the housing of said engine, said second engine part is constituted by a rotating hub of said engine, and said sealing ring is split in a low pressure region of said engine.

9. An arrangement as defined in claim 1 wherein said first engine part is constituted by a rotary hub of said engine carrying a piston, said second engine part is constituted by a further rotary hub of said engine carrying a piston, each of said pistons being provided with sealing strips, and said sealing ring is split in the region of the sealing strips of one of said pistons.

10. An arrangement as defined in claim 1 wherein said groove has a rectangular cross section and said sealing ring has an outer flank defining a cylinder and bearing against the outer side wall of said groove.

11. An arrangement as defined in claim 2 wherein said first engine part is constituted by an engine housing having spark plugs in one region and outlet means in a second region, and said springs are adjusted so that those springs adjacent said first region apply a higher compressive force than those springs adjacent said second region.

References Cited

UNITED STATES PATENTS

| | | | |
|---|---|---|---|
| 1,814,355 | 7/1931 | Williams | 277—119 |
| 3,024,048 | 3/1962 | Kobert | 277—137 X |
| 3,181,437 | 5/1965 | Rumsey | 123—8 |
| 3,314,682 | 4/1967 | Peras | 123—8 X |

FOREIGN PATENTS 712,832  6/1965  Canada.

RALPH D. BLAKESLEE, *Primary Examiner.*